Patented Nov. 21, 1922.

1,436,164

UNITED STATES PATENT OFFICE.

VICTOR MORITZ GOLDSCHMIDT, OF CHRISTIANIA, NORWAY, ASSIGNOR TO TITAN CO. A/S., OF CHRISTIANIA, NORWAY.

TITANIUM PIGMENT AND PROCESS OF PRODUCING SAME.

No Drawing.   Application filed May 10, 1917. Serial No. 167,834.

*To all whom it may concern:*

Be it known that I, VICTOR MORITZ GOLDSCHMIDT, a subject of the King of Norway, residing at Christiania, Norway, have invented certain new and useful Improvements in Titanium Pigments and Processes of Producing Same; and I do hereby declare the following to be a full, clear, and exact description of the invention, such as will enable others skilled in the art to which it appertains to make and use the same.

In United States Letters Patent No. 1,348,129, granted July 27, 1920, I have described a material for use as a pigment comprising a more or less crystalline titanium oxygen compound. The present application is directed to a titanium pigment in which all or a part of the titanium is present in the form of a titanate, the specific titanate herein described being calcium titanate although, as will be understood, acid, normal and basic titanates of other bivalent metals may be used.

This application also relates to a process of producing a pigment comprising or containing such titanates, preferably in a crystalline modification, and also containing titanium dioxid and an insoluble salt of a bivalent metal. Such pigments are insoluble or sparingly soluble in water, and are very stable against both oxidizing and reducing agents, so that they resist the action of the atmosphere and of the vehicle. The titanium compounds present therein have high specific gravity and a high refractive index, whereby the pigment possesses great hiding power, as is disclosed in the aforesaid application.

Among the salts which I have found useful of the acid, normal and basic titanates of the bivalent metals are the titanates of calcium, strontium, barium, magnesium, lead, zinc and manganese. Solid solutions of titanium oxid in other compounds, for instance, a titanate, may be employed. The normal calcium titanate ($CaTiO_3$) which combines great stability with a very high refractive index (2.4 in sodium light) may for instance be produced in the following manner:—

A calcium titanate pigment may for instance be produced in the following manner: Ilmenite is treated with sulphuric acid and the resulting sulphate mass is lixiviated. Titanic acid is then precipitated from the resulting solution. The titanic acid so obtained, and which usually will contain a quantity of the $SO_4$ radical in a combined or absorbed condition, is then mixed with an equivalent of lime (as $CaO$, $Ca(OH)_2$) or $CaCO_3$. To effect the combination of the content of the $SO_4$ radical an excess quantity of the calcium compound may be used. The mixture is heated to a sufficiently high temperature to cause the formation of calcium titanate ($CaTiO_3$), preferably in a crystalline condition.

The resulting product is of a white or yellowish white colour. It is an excellent pigment with a high refractive index and with great hiding power.

The titanates and their double salts give white pigments, when the bases of the salts are colorless, and different colors, when the base is colored.

Compounds, in which the tetravalent titanium occurs as a base, give white pigments, when the acid forming oxid is colorless, but give differently colored pigments, when the acid forming oxid is colored.

By mixing these titanium pigments with other pigments or fillers, pigments or paints may be produced possessing widely different shades and having hiding properties according to particular requirements.

The pigments described may be used in connection with any vehicle ordinarily employed in the preparation of paints, and other coating compositions.

In the aforesaid Letters Patent I have disclosed a pigment comprising titanium dioxid in a more or less crystalline formation alone or associated with amorphous titanium dioxid or with a sulphate of an alkaline earth metal or both and a process of obtaining such a pigment involving the heating of an amorphous titanium dioxid compound to a sufficient temperature to produce the desired crystallization, and I have therein broadly claimed such a process and a pigment without limitation to the presence therein or the character of other substances which may be associated with the crysalline dioxid, and I do not therefore herein make claims reading on such prior Letters Patent but what I do claim herein and desire to secure by Letters Patent of the United States is:—

1. A pigment comprising a solid solution of an oxid of titanium in a titanate.

2. As a new and useful article, a material suitable for use as a pigment, comprising principally titanium oxid, calcium titanate and a neutral and relatively insoluble calcium salt.

3. As a new and useful article, a material suitable for use as a pigment, comprising principally titanium oxid in a crystalline modification, calcium titanate and a neutral and relatively insoluble calcium salt.

4. As a new and useful article, a material suitable for use as a pigment, comprising principally titanium oxid in a crystalline modification, calcium titanate and calcium sulphate.

5. The process of treating precipitated titanium hydrates containing an undesired acid substance embracing the $SO_4$ radical whereby the said undesired acid substance is eliminated and a material suitable for use as a pigment is formed, which comprises treating the precipitate with a compound of one of the bivalent metals capable of combining with the acid radical and calcining the mass, whereby a titanate of the bivalent metal is formed.

6. The process of treating precipitated titanium hydrates containing an undesired acid substance embracing the $SO_4$ radical whereby the said undesired acid substance is eliminated and a material suitable for use as a pigment is formed, which comprises treating the precipitate with a compound of one of the bivalent metals capable of combining with the acid radical and calcining the mass, whereby a crystalline titanate of the bivalent metal is formed.

7. The process of treating precipitated titanium hydrates containing an undesired acid substance embracing the $SO_4$ radical whereby the said undesired acid substance is eliminated and a material suitable for use as a pigment is formed, which comprises treating the precipitate with a compound of one of the bivalent metals capable of combining with the acid radical and in amount in excess of that required therefor and calcining the mass, whereby a titanate of the bivalent metal is formed.

In testimony that I claim the foregoing as my invention, I have signed my name in presence of two subscribing witnesses.

VICTOR MORITZ GOLDSCHMIDT.

Witnesses:
C. NORMAR,
C. FABRICIUS HANSEN.